United States Patent
Park

(10) Patent No.: US 6,973,018 B2
(45) Date of Patent: Dec. 6, 2005

(54) METHOD OF CORRECTING TILT IN A DVD PLAYER

(75) Inventor: Deok-Hwan Park, Kyungki-do (KR)

(73) Assignee: DVS Korea Co., Ltd., Sungnam (KR)

( * ) Notice: Subject to any disclaimer, the term of this patent is extended or adjusted under 35 U.S.C. 154(b) by 602 days.

(21) Appl. No.: 10/251,448

(22) Filed: Sep. 20, 2002

(65) Prior Publication Data

US 2003/0198161 A1    Oct. 23, 2003

(30) Foreign Application Priority Data

Apr. 23, 2002  (KR) ............................... 2002-22180

(51) Int. Cl.[7] ............................................... G11B 7/00
(52) U.S. Cl. ................................. 369/53.19; 369/44.32
(58) Field of Search .................... 369/44.25, 44.26, 369/44.32, 53.19, 53.12, 53.14

(56) References Cited

U.S. PATENT DOCUMENTS 5,483,512 A * 1/1996 Yanagawa ................ 369/53.19

* cited by examiner

Primary Examiner—Nabil Hindi
(74) Attorney, Agent, or Firm—Cooper & Dunham LLP

(57) ABSTRACT

This tilt correcting method includes the step of monitoring jitter values while adjusting a turntable or guide rail after a wobble disc is placed on the turntable. Thereafter, it is determined whether the depths of valleys of monitored jitter values are different, it is determined that the reference tilt is a radial tilt if it is determined that the depths of valleys of the monitored jitter values are different, and the radial tilt is corrected. If it is determined that the depths of valleys of the monitored jitter values are not different, it is determined whether the heights of peaks of the monitored jitter values are different, it is determined that the reference tilt is a tangential tilt if it is determined that the heights of peaks of the monitored jitter values are different, and the tangential tilt is corrected.

2 Claims, 5 Drawing Sheets

METHOD OF CORRECTING TILT IN A DVD PLAYER

BACKGROUND OF THE INVENTION

1. Field of the Invention

The present invention relates generally to a method of correcting a tilt in a digital versatile disc player, and more particularly to a method of correcting a tilt in a digital versatile disc player, in which a wobble disc is fabricated to form a reference tilt having a wobble angle "theta" between a disc and a turntable, and it is quickly and precisely determined whether the reference tilt is a tangential tilt or radial tilt while the wobble disc is rotated and jitter values are monitored during tilt adjustment, thus enabling the easy correction of the tilt. Here, a tilt (or, skew) detonates an angle between two normal vectors in two or more planes, a jitter detonates a synchronization difference between a clock and a sample signal, and a wobble disc detonates a vertical deviation disc.

2. Description of the Prior Art

In general, digital versatile disc (DVD)-ROM and DVD players are each equipped with a pick-up head (PUH) and a pick-up base (PUB), the PUB being comprised of a spindle motor and a feeding system.

In the PUB, a turntable mounted on the spindle motor for rotating a disc and a guide rail for moving the PUH in a radial direction of the disc are assembled together, and a tilt is caused between the turntable and the surface of the guide rail by manufacture and assembly tolerances.

Additionally, in the manufacturing process of the PUH, a tilt is caused between an optical axis and a reference plane assembled to the guide rail of the PUB by the optical axis adjustment of the PUH.

In the DVD, the numerical aperture (NA) of an objective lens is set to 0.6 to increase the density of data, which is larger than 0.45, that is, the NA of a Compact Disc (CD). Optical aberration due to an optical axis tilt is proportional to the square of the NA, so the tilt generated as mentioned above greatly affects the quality of signals.

In order to overcome such a problem in the DVD, there has been proposed a new PUB structure in which an optical axis between a disc and a PUH is adjusted by adjusting a turntable or guide rail.

For the new PUH structure, the disc, which is used when the optical axis is adjusted, is typically a flat disc, and a method, in which the turntable or the guide rail is adjusted and the jitter values are monitored, is mainly used. Such an optical axis tilt is classified into a radial tilt or tangential tilt depending on the direction of a tilt. The tangential tilt designates a tilt in the direction in which pits of the disc are read, and the radial tilt designates a tilt in the radial direction of the disc. The optical adjustment provides a technique that is capable of adjusting both the radial and tangential tilts in the adjustment of two or three points.

However, the prior tilt adjustment method mentioned above has a drawback that the state of the optical axis tilt is not known since the flat DVD disc is used.

In addition, since the tilt should be adjusted in a way that adjustment points are manually shifted here and there in a direction in which the jitter is decreased when the tilt is adjusted, there is a drawback that it is difficult for those other than skilled persons to adjust the tilt.

In addition, since a user cannot know which of the radial tilt and the tangential tilt is the cause of a bad jitter, the user should perform a tilt correction operation while shifting the adjustment points here and there. Therefore, there is a drawback that it takes a long time to complete the tilt correction.

SUMMARY OF THE INVENTION

Accordingly, the present invention has been made keeping in mind the above problems occurring in the prior art, and an object of the present invention is to provide a method of correcting a tilt in a digital versatile disc player, in which a wobble disc is fabricated to form a reference tilt having a wobble angle "theta" between a disc and a turntable, and it is quickly and precisely determined whether the reference tilt is a tangential tilt or radial tilt while the wobble disc is rotated and jitter values are monitored during tilt adjustment, thus enabling the easy correction of the tilt.

In order to accomplish the above object, the present invention provides a method of correcting a tilt in a DVD player, comprising the steps of: monitoring jitter values while adjusting a turntable or guide rail after a wobble disc, which is manufactured to form a reference tilt of a wobble angle "theta" between the disc and the turntable, is placed on the turntable; determining whether the depths of valleys of monitored jitter values are different, determining that the reference tilt is a radial tilt if it is determined that the depths of valleys of the monitored jitter values are different, and correcting the radial tilt; and if it is determined that the depths of valleys of the monitored jitter values are not different, determining whether the heights of peaks of the monitored jitter values are different, determining that the reference tilt is a tangential tilt if it is determined that the heights of peaks of the monitored jitter values are different, and correcting the tangential tilt.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
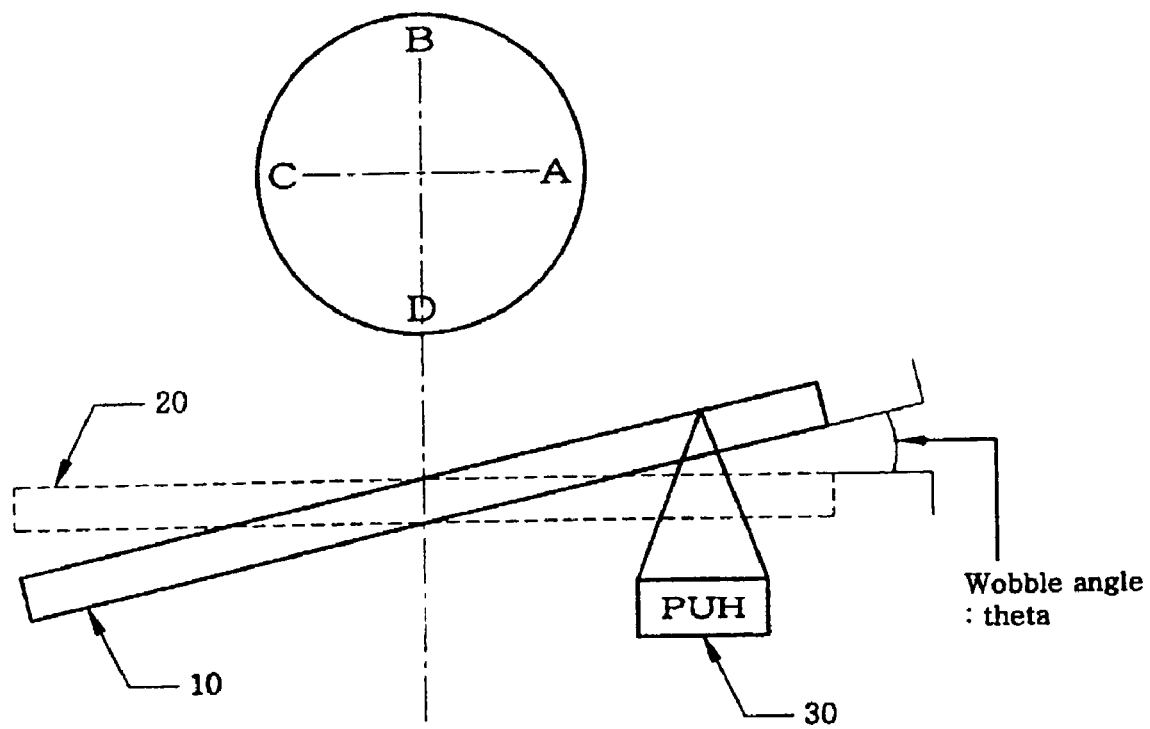
FIG. 1 is a diagram showing the relationship between a reference disc and a wobble disc in the present invention.

FIG. 1 is a diagram showing the relationship between a reference disc and a wobble disc in the present invention.

In this figure, reference numeral 10 designates a wobble disc, reference numeral 20 designates a reference disc, and reference numeral 30 designates a PUH.

The wobble disc denotes a disc that is rotated by a wobble angle "theta" with respect to the surface of the reference disc 20. If a height in an "A"-axis direction is set as a reference, "A" lies in a highest point, "B" lies at a midpoint, "C" lies at a lowest point, and "D" lies at a midpoint.

The relationship between the wobble angle "theta" and the tilt between the pick-up and the wobble disc due to the rotation of the wobble disc can be expressed as follows; A: radial+theta/tangential 0, B: radial 0/tangential+theta, C: radial−theta/tangential 0, and D: radial 0/tangential−theta.

A jitter characteristic curve depending on the tilt angle, which represents a signal quality characteristic of the PUH 30, shows a difference in signal quality depending on the tilt angle between the optical axis of a PUH and the disc. From the jitter characteristic curve, it can be seen that the degree of the signal quality in a pits scanning direction is different from that in a different direction.

Hereinafter, an example of the jitter characteristic depending on a tilt angle will be described. From this example, it will be seen that the jitter is more sensitive to the tilt in the tangential direction than that in the radial direction.

Figure 2:
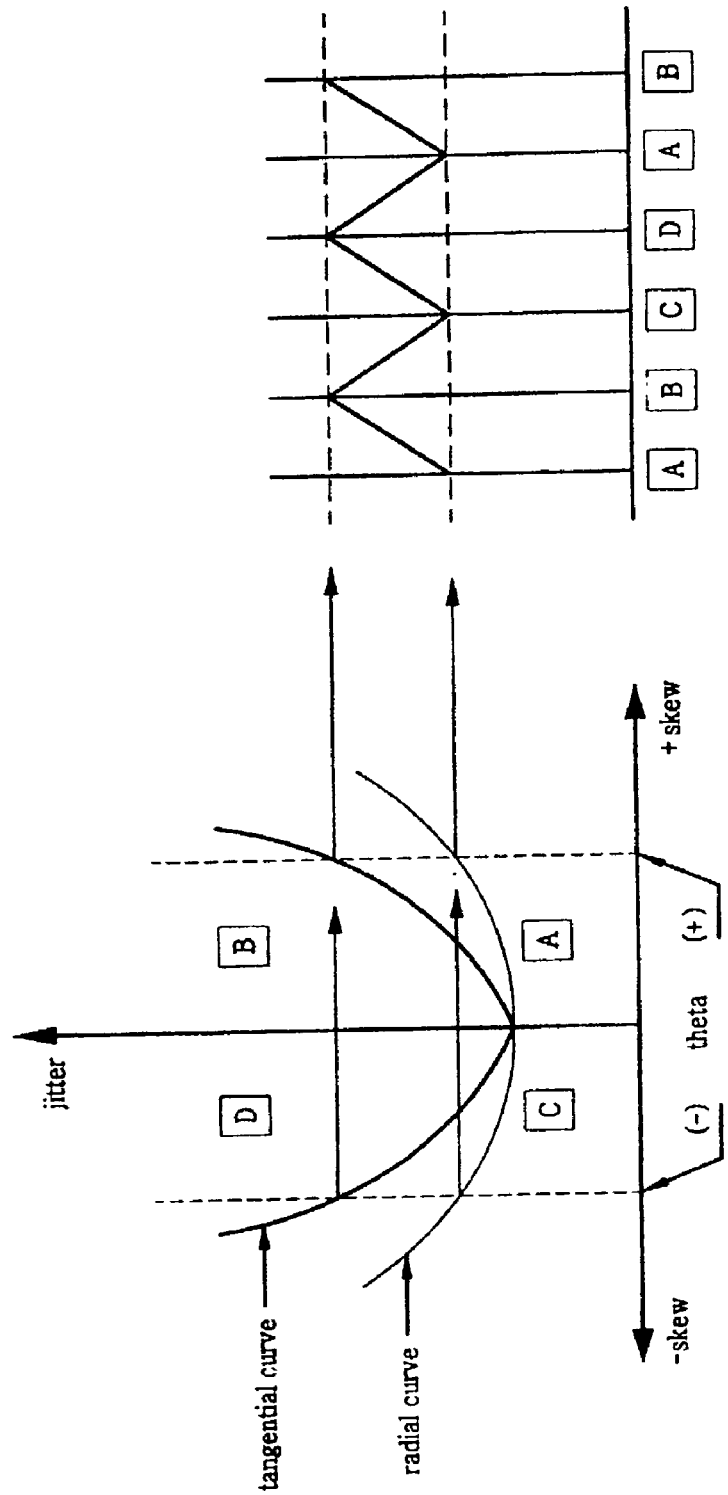
FIG. 2 is a diagram showing a jitter characteristic curve of a general optical pick-up depending on a tilt angle and the relationship between the rotation of the wobble disc and the magnitude of a jitter.

FIG. 2 is a diagram showing a jitter characteristic curve of a general optical pick-up depending on a tilt angle and the relationship between the rotation of the wobble disc and the magnitude of a jitter.

As shown in this figure, if the relationship between the position of the disc and the optical axis of the PUH is observed in terms of the wobble angle "theta", "A" indicates a state in which the radial tilt is generated by +theta (here, the tangential tilt is "0"), "B" indicates a state in which the tangential tilt is generated by +theta (here, the radial tilt is "0"), "C" indicates a state in which the radial tilt is generated by −theta, and "D" indicates a state in which the tangential tilt is generated by −theta.

The above-described relationship, that is, the relationship between the characteristic due to the direction of a jitter and the rotation of the disc will be used to describe the following relationship.

Figure 3:
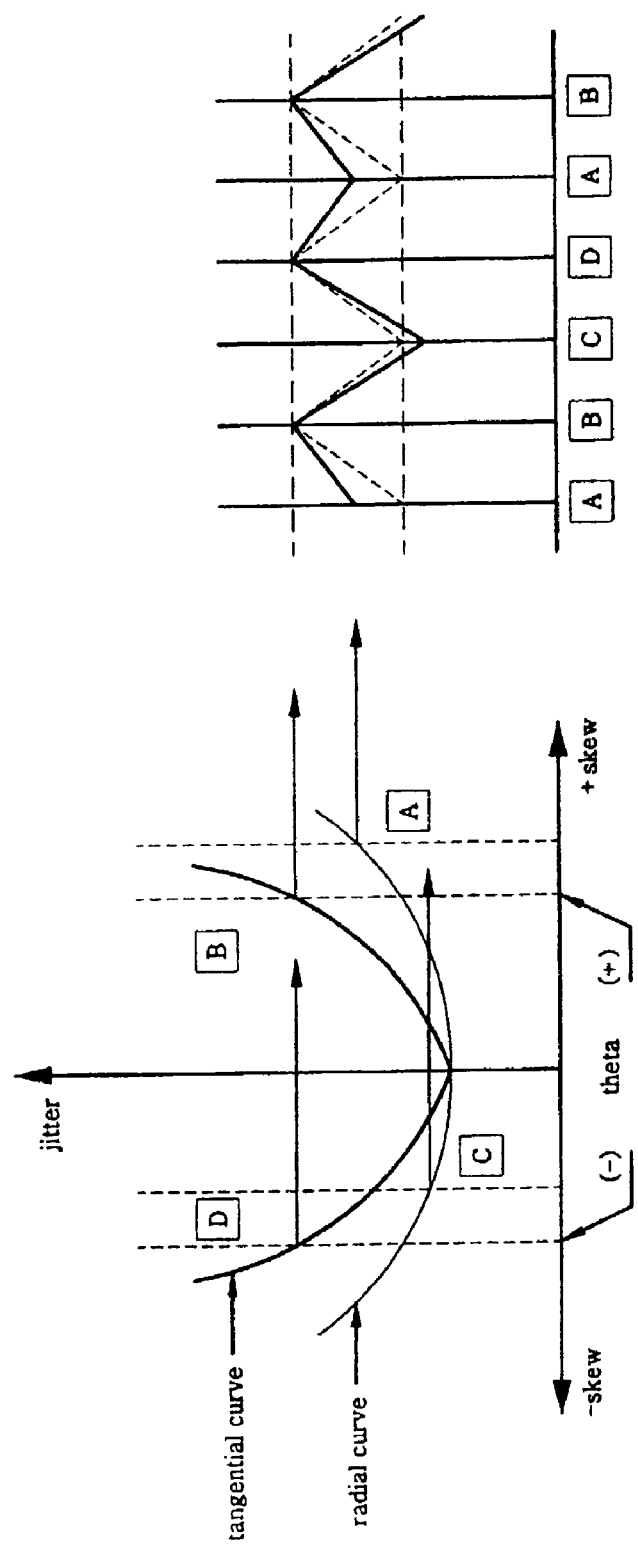
FIG. 3 is a diagram showing the relationship between the rotation of the wobble disc and the magnitude of the jitter when a radial tilt is present between the optical pick-up and a disc table.

FIG. 3 is a diagram showing the relationship between the rotation of the wobble disc and the magnitude of jitter when a radial tilt is present between the optical pick-up and the disc table.

If the disc and the optical axis of the PUH are deviated in a radial direction, "A" and "C" undergo level changes to shift their positions on a radial jitter curve, while "B" and "D" undergo little change to represent the jitters of the same level.

Namely, in the level of a jitter, one of "A" and "C" goes down and the other goes up. In other words, one radial tilt state is represented every half a turn during one revolution of the disc. In this case, it will be understood that the different depths of valleys cause the tilt between the PUH optical axis and the disc to be generated in the radial direction.

Figure 4:
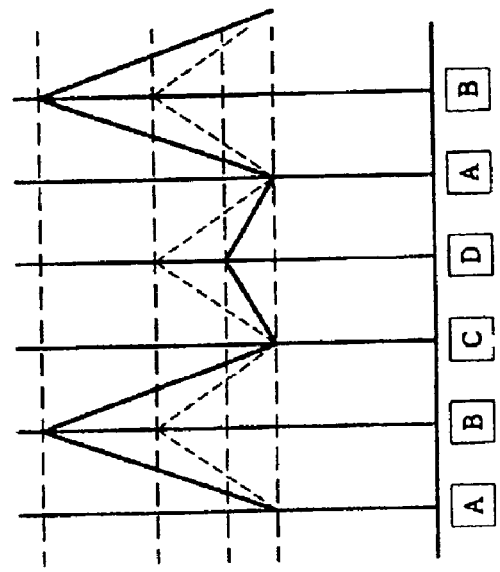
FIG. 4 is a diagram showing the relationship between the rotation of the wobble disc and the magnitude of jitter when a tangential tilt is present between the optical pick-up and the disc table.
Figure 4:
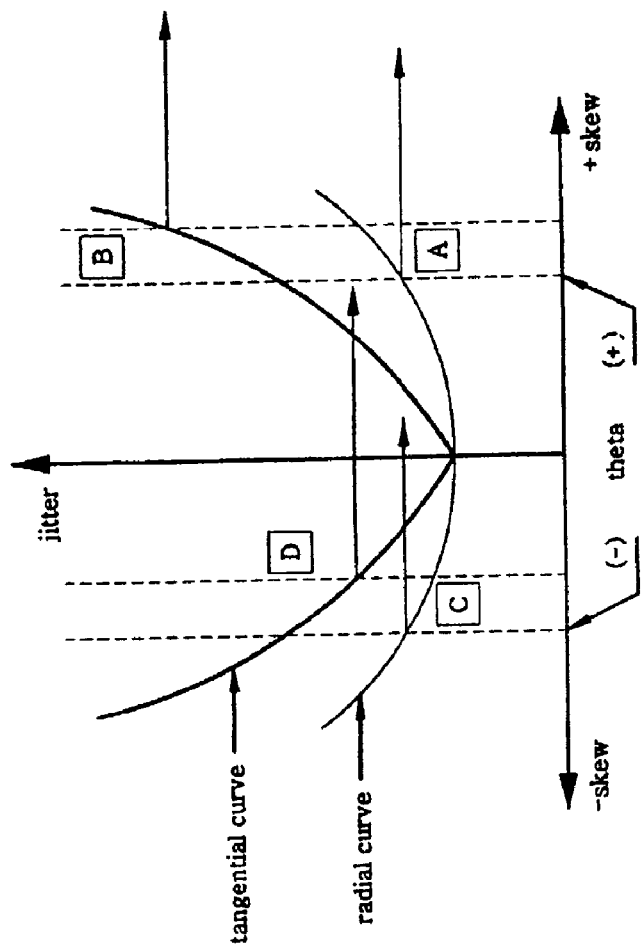

FIG. 4 is a diagram showing the relationship between the rotation of the wobble disc and the magnitude of a jitter when a tangential tilt is present between the optical pick-up and a disc table.

If the disc and the PUH optical axis are deviated in the tangential direction, "A" and "C" are not affected by the tangential tilt to represent a level corresponding to the radial tilt, while "B" and "D" show levels corresponding to respective tilts. Namely, it can be seen that the heights of peaks occurring twice during one revolution of the disc are different with respect to a dotted line that represents a normal state.

In other words, when the tilt between the disc and the PUH optical axis is present in radial and tangential directions, the principle of the method of adjusting the tilt according to the present invention is to adjust the relationship between the disc and the PUH optical axis while monitoring the level of the jitter.

Figure 5:
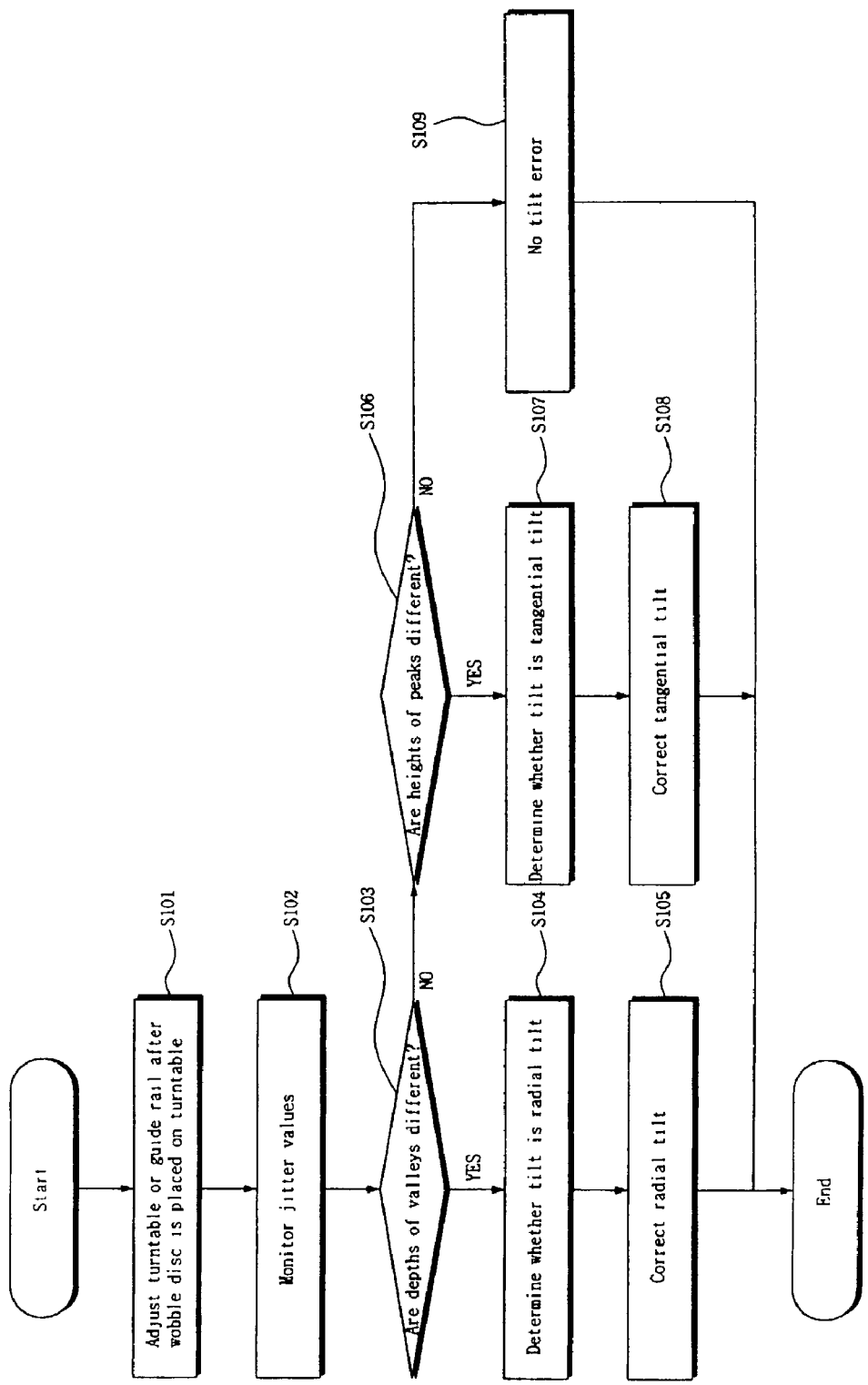
FIG. 5 is a flowchart showing a method of correcting a tilt in a DVD player according to the present invention.

FIG. 5 is a flowchart showing the method of correcting a tilt in the DVD player in accordance with the present invention.

As shown in this figure, the method comprises the steps of monitoring jitter values while adjusting a turntable or guide rail after a wobble disc, which is manufactured to form a tilt of a wobble angle "theta" between the disc and the turntable, is placed on the turntable at steps S101 and S102; determining whether depths of valleys of monitored jitter values are different, determining that the tilt is a radial tilt if it is determined that the depths of valleys of monitored jitter values are different, and correcting the radial tilt at steps S103 to S105; if it is determined that the depths of valleys of the monitored jitter values are not different, determining whether the heights of peaks of monitored jitter values are different, determining that the tilt is a tangential tilt if it is determined that the heights of peaks of monitored jitter values are different, and correcting the tangential tilt at steps S106 to S108; and determining that the tilt is not present if it is determined that the depths of valleys and the heights of peaks are not different at step S109.

The method of correcting the tilt in the DVD player according to the present invention will be described in detail below.

First, a turntable or guide rail is adjusted at step S101 after a wobble disc (see FIG. 1) fabricated previously to form a tilt having a wobble angle "theta" between the disc and the turntable is placed on the turntable, and jitter values are monitored at step S101.

Next, it is determined whether the depths of valleys of monitored jitter values are different at step S103, it is determined that the tilt is a radial tilt at step S104 if it is determined that the depths of valleys of the monitored jitter values are different (see FIG. 3), and the radial tilt is corrected at step S105. A method of correcting the radial tilt used in the present invention is identical with a conventional one.

Next, if it is determined that the depths of valleys of monitored jitter values are not different at step S103, it is determined whether the heights of peaks of the monitored jitter values are different at step S106. It is determined that the tilt is a tangential tilt at step S107 if it is determined that the heights of peaks of the monitored jitter values are different (see FIG. 4), and the tangential tilt is corrected at step S108. A method of correcting the tangential tilt used in the present invention is identical with a conventional one.

In addition, it is determined that the tilt is not present or has been previously corrected at step S109 if it is determined that the heights of peaks are not different at step S106. Then, the process of correcting the tilt is terminated.

On the other hand, a system for adjusting the tilt includes a shaft adjustment system and a turntable adjustment system. Typically, the PUH is assembled to a guide shaft and fixed to the PUB. The shaft adjustment system is a system for adjusting the optical axis of the PUH by adjusting the guide shaft. The turntable adjustment system is a system for adjusting the reference plane of the disc.

The present invention is applicable to a system where the wobble disc is used, regardless of the adjustment system. In addition, the present invention is also applicable to two or three adjustment points in the shaft adjustment system.

As described above, the present invention has an advantage that inexperienced persons can easily perform the operation for correcting the tilt by using waveforms of jitter level.

In addition, by utilizing a phenomenon in which a signal having a uniform pattern is repeated at a particular frequency, the operation of correcting the tilt can be automated.

Furthermore, since the tilt can be corrected by a direct adjustment system, the operation of correcting the tilt can be easily performed, time required for the operation can be reduced, and it can be determined that the operation is desirably performed.

Although the preferred embodiment of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of correcting a tilt in a DVD player, comprising the steps of:

monitoring jitter values while adjusting a turntable or guide rail after a wobble disc, which is manufactured to form a reference tilt of a wobble angle "theta" between the disc and the turntable, is placed on the turntable;

determining whether depths of valleys of monitored jitter values are different, determining that the reference tilt is a radial tilt if it is determined that the depths of valleys of monitored jitter values are different, and correcting the radial tilt; and if it is determined that the depths of valleys of monitored jitter values are not different, determining whether the heights of peaks of monitored jitter values are different, determining that the reference tilt is a tangential tilt if it is determined that the heights of peaks of monitored jitter values are different, and correcting the tangential tilt.

2. The method according to claim 1, further comprising the steps of determining that the reference tilt is not present or has been previously corrected if it is determined that the depths of valleys and the heights of peaks are not different, and terminating a process of correcting the tilt.

* * * * *